United States Patent [19]

Petschel et al.

[11] Patent Number: 5,569,734
[45] Date of Patent: Oct. 29, 1996

[54] CURABLE EPOXY RESIN MIXTURES CONTAINING METAL SALTS

[75] Inventors: Klaus Petschel, Hartheim; Uwe Weinzierl, Jena, both of Germany

[73] Assignee: Ciba-Geigy Corporation, Tarrytown, N.Y.

[21] Appl. No.: 432,112

[22] Filed: May 3, 1995

[30] Foreign Application Priority Data

May 10, 1994 [CH] Switzerland ............... 1458/94

[51] Int. Cl.⁶ ............... C08G 59/68; C08G 59/70
[52] U.S. Cl. ............... 528/92; 525/484; 525/504; 528/327; 528/347; 528/361; 528/407; 528/410; 528/411; 528/412
[58] Field of Search ............... 528/92, 327, 347, 528/361, 407, 410, 411, 412; 525/504, 484

[56] References Cited

U.S. PATENT DOCUMENTS

| | | | |
|---|---|---|---|
| 3,361,715 | 1/1968 | Vogt et al. | 260/47 |
| 3,553,166 | 1/1971 | Anderson et al. | 260/47 |
| 3,677,978 | 6/1972 | Dowbenko et al. | 528/94 |
| 3,956,241 | 5/1976 | Steele et al. | 528/92 |
| 4,101,514 | 7/1978 | Thom | 528/109 |
| 5,395,913 | 3/1995 | Bottcher et al. | 528/92 |
| 5,444,030 | 8/1995 | Böttcher et al. | 502/150 |

FOREIGN PATENT DOCUMENTS

| | | |
|---|---|---|
| 0589166 | 3/1994 | European Pat. Off. |
| 1904641 | 11/1969 | Germany |
| 2525248 | 1/1976 | Germany |
| 484867 | 3/1970 | Switzerland |
| 496749 | 11/1970 | Switzerland |
| WO91/13925 | 9/1991 | WIPO |

OTHER PUBLICATIONS

Chem Abst. vol. 63, col. 5850, 1965.
Chem Abst. 92:7886.
Chem Abst. 111:125680.
Derwent Abst. 85–217590 [36].

*Primary Examiner*—Frederick Krass
*Attorney, Agent, or Firm*—David R. Crichton

[57] ABSTRACT

Curable mixtures comprising
(a) an epoxy compound having on average more than one epoxy group per molecule,
(b) a metal complex salt of formula I $$M(L)_a X'_b X''_c \cdot dY \qquad (I),$$

wherein
M is a cation of a transition metal,
L is a Lewis base,
a is a number from 2 to 6,
X' is an anion of an acid radical,
X" is an cation of an acid radical differing from X'
b is 0 or a number which, together with the number c, which is greater than 0, corresponds to the valency of the cation of the transition metal,
Y is a solvent molecule, and
d is 0 or a number from 0 to 5, and,
as optional component
(c) a hardener for epoxy resins,
are distinguished by good solubility of the metal salt in the epoxy resin and achieve uniform crosslinking during the curing of the epoxy resin.

13 Claims, No Drawings

CURABLE EPOXY RESIN MIXTURES CONTAINING METAL SALTS

The present invention relates to curable epoxy resin mixtures comprising, in addition to an epoxy resin, a metal complex salt and, as optional component, an epoxy resin hardener, and to the mouldings or coatings obtained from the curable mixtures by curing.

The use of organic metal compounds such as metal imidazoles, metal chelates or metal complex compounds as curing catalysts or curing accelerators for the curing of epoxy resins is known. DE-OS 25 25 248, for example, discloses the use of chrome(III) chelates together with an unstable hydrogen compound as curing catalyst. To effect the dissolution of the chrome(III) chelates in the resin, they need to be incorporated into the epoxy resin at elevated temperature, which adversely affects the processing properties of the curable mixture.

PCT application WO 91/13925 discloses the use of Lewis base adducts of metal chelates and Lewis base metal complex salts as hardeners for epoxy resins. The Lewis base adducts of the metal chelates are mixed complexes of chelate-forming ligands and Lewis bases. The Lewis base metal complex salts contain a high proportion of 7 or 8 Lewis bases in the complex salt. These hardeners, too, still have insufficient solubility in the epoxy resin, causing sedimentation of the hardener in the epoxy resin and non-uniform crosslinking of the epoxy resin during curing. This adversely affects the end-use properties of the cured epoxy resin.

It has now been found that certain complexes of transition metals having a heterocyclic Lewis base and two differing anions of an acid radical do not have the above-mentioned drawbacks and are distinguished by substantially enhanced solubility in epoxy resins.

Accordingly, the present invention relates to curable mixtures comprising (a) an epoxy compound containing on average more than one epoxy group per molecule, (b) a metal complex salt of formula I $$M(L)_a X'_b X''_c \cdot dY \qquad (I),$$

wherein

M is a cation of a transition metal,

L is a Lewis base, a is a number from 2 to 6,

X' is an anion of an acid radical,

X'' is an anion of an acid radical differing from X', b is 0 or a number which, together with the number c, which is greater than 0, corresponds to the valency of the cation of the transition metal, Y is a solvent molecule, and d is 0 or a number from 0 to 5, and as optional component (c) a hardener for epoxy resins.

Component (a) in the novel curable epoxy resin mixtures may be the epoxy resins customary in epoxy resin technology. Typical examples of epoxy resins are:

I) Polyglycidyl and poly(β-methylglycidyl) esters which are obtainable by reacting a compound containing at least two carboxyl groups in the molecule and epichlorohydrin or β-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, suberic acid, azelaic acid or dimerised or trimerised linoleic acid.

It is, however, also possible to use cycloaliphatic polycarboxylic acids such as tetrahydrophthalic acid, 4-methyltetrahydrophthalic acid, hexahydrophthalic acid or 4-methylhexahydrophthalic acid.

Aromatic polycarboxylic acids can also be used, typically phthalic acid, isophthalic acid and terephthalic acid.

II) Polyglycidyl or poly(β-methylglycidyl) ethers which are obtainable by reacting a compound containing at least two free alcoholic hydroxyl groups and/or phenolic hydroxyl groups and epichlorohydrin or β-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol, sorbitol, as well as from polyepichlorohydrins. They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenylmethane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

III) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl) ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl- 3',4'-epoxycyclohexanecarboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

The above-mentioned epoxy compounds are known and some are commercially available.

Component (a) in the novel mixtures is preferably a diglycidyl ether or polyglycidyl ether, at least one epoxidised polyolefin or fatty acid ester, a cycloaliphatic epoxy compound or a glycidyl compound of aromatic amines.

Component (a) in the novel mixtures is preferably a diglycidyl ether of a bisphenol.

The metal complex salts contained in the novel mixture as component (b) are also disclosed, inter alia, in Journal inorg. nucl. Chemistry, 1977, Vol. 39, pages 2167–2171, or in Journal inorg. nucl. Chemistry, 1978, Vol. 40, pages 1173–1174, and can generally be prepared by dissolving a metal salt, for example $Co(H_2O)_6Cl_2$, and equimolar amounts of the compound containing an acid radical, such as KSCN, in an organic solvent, typically ethanol or acetone, usually at room temperature, and then reacting the filtered solution with an equimolar amount of a Lewis base L, e.g. ethylimidazole, in the temperature range from room temperature to the boiling point of the solvent employed, and by isolating the metal complex salts from the reaction solution in known manner.

Component (b) in the novel mixtures is preferably a compound of formula I, wherein M is a cation of a transition metal of the first transition series, preferably cobalt or iron.

Lewis bases L in formula I may be all nucleophilic molecules or ions containing a lone electron pair. Compounds of this kind are, for example, pyridines and the derivatives thereof, such as alkyl-substituted pyridines, imidazoles, alkyl-substituted imidazoles, pyrazoles and the derivatives thereof, triazoles, ethers, including cyclic ethers such as tetrahydrofuran, alcohols, ketones, thioethers or mercaptans.

Component (b) in the novel mixtures is preferably a metal complex salt of formula I, wherein L is an imidazole, pyrazole or triazole.

In formula I, X' and X" may be different anions of any acid radical, X" preferably being an anion of a pseudohydrohalic acid, such as $SCN^-$ or $OCN^-$. Accordingly, mixtures comprising as component (b) a metal complex salt of formula I, wherein X" is $SCN^-$ or $OCN^-$, likewise constitute a preferred embodiment of this invention.

Furthermore, component (b) in the novel mixtures is preferably a metal complex salt of formula I, wherein a is 4, 5 or 6.

The metal complex salt of formula I may contain as solvent molecule Y an inorganic or organic solvent customary for the preparation of metal salt complexes, typically water or acetone.

Component (b) in the novel mixtures is preferably a metal complex salt of formula I, wherein S is water.

In a particularly preferred embodiment of this invention, component (b) is a metal complex salt of formula $Fe(Im)_{4.4}(SCN)_3 \cdot 1.6\ H_2O$, $Fe(Etlm)_{4.4}(SCN)_3 \cdot 3.6\ H_2O$, $Co(Im)_5(SCN)Cl.2\ H_2O$ or $Co(Im)_6(OCN)Cl.3\ H_2O$, wherein Im is imidazole and Etlm is 2-ethylimidazole.

The novel mixtures usually contain component (b) in an amount of 0.5 to 20% by weight, preferably in an amount of 1 to 10% by weight, based on component (a).

If the novel epoxy resin mixtures additionally contain the component (c) as hardener for the epoxy resin, then this component (c) may be e.g. dicyandiamide, a polyamine or a polycarboxylic acid anhydride.

The epoxy resin hardener (c) in the novel mixtures may be the hardeners customary in epoxy resin technology, typically polycarboxylic acids and the anhydrides thereof, dicyandiamide, polyamines, polyaminoamides, amino group-containing adducts, aliphatic or aromatic polyols, or catalytic hardeners.

Polycarboxylic acids suitable for curing the novel mixtures are typically aliphatic polycarboxylic acids, e.g. maleic acid, oxalic acid, succinic acid, nonylsuccinic acid or dodecylsuccinic acid, glutaric acid, adipic acid, pimelic acid, suberic acid, azelaic acid or dimerised or trimerised linoleic acid, cycloaliphatic polycarboxylic acids, such as tetrahydrophthalic acid, methylenedomethylenetetrahydrophthalic acid, hexachloroendomethylenetetrahyclrophthalic acid, 4-methyltetrahydrophthalic acid, hexahydrophthalic acid or 4-methylhexahydrophthalic acid, or aromatic polycarboxylic acids, such as phthalic acid, isophthalic acid, terephthalic acid, trimellitic acid, pyromellitic acid or benzophenone-3, 3',4,4'-tetracarboxylic acid, as well as the anhydrides of the cited polycarboxylic acids.

Polyamines suitable for curing the above-mentioned mixtures are aliphatic, cycloaliphatic, aromatic or heterocyclic amines, such as ethylenediamine, propane-1,2-aliamine, propane-1,3-diamine, N,N-diethylethylenediamine, hexamethylenediamine, diethylenetriamine, triethylenetetramine, tetraethylenepentamine, N-(2-hydroxyethyl)diethyltriamine, N-(2-hydroxypropyl)diethyltriamine and N-(2-cyanoethyl)diethyltriamine, 2,2,4-trimethylhexane-1,6-diamine, 2,3,3,-trimethylhexane-1,6-aliamine, N,N-dimethyl-1,3-diamine and N,N-diethylpropane-1,3-aliamine, ethanolamine, m- and p-phenylenediamine, bis(4-aminophenyl)methane, aniline-formaldehyde resin, bis(4-aminophenyl)sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine(isophoronediamine) and N-(2-aminoethyl)piperazine.

Polyaminoamides suitable for curing the above-mentioned mixtures are, for example, the reaction products obtained by reaction of polycarboxylic acids, preferably of di- or trimerised fatty acids, with polyamines, preferably aliphatic polyamines in a molar excess, such as are described, inter alia, in Handbook of Epoxy Resins, 1967, pages 10-2 to 10-10 by H. Lee and K. Neville.

The use of amino group-containing adducts of an amine and a polyepoxy compound as curing agents for epoxy resins is also known. Said adducts can be used for curing the above-mentioned epoxy resin compositions and are obtained, for example, by reaction of epoxy resins with polyamines in equivalent excess. Such amino group-containing adducts are described in more detail, inter alia, in U.S. Pat. Nos. 3,538,184; 4,330,659; 4,500,582 and 4,540,750.

Suitable aliphatic polyols for curing the above-mentioned mixtures are, for example, ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol or sorbitol.

Aromatic polyols suitable for curing the above-mentioned epoxy resin compositions are, for example, mononuclear phenols, such as resorcinol, hydroquinone or N,N-bis(2-hydroxyethyl)aniline, or polynuclear phenols, such as p,p'-bis(2-hydroxyethylamino)diphenylmethane, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane and 2,2-bis(3,5-dibromo-4-hydroxyphenyl)propane, and novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, e.g. 4-chlorophenol, 2-methylphenol or 4-tert-butylphenol, or by condensation with bisphenols, for example those of the type defined above.

The amount of hardener (c) used depends on the chemical nature of the hardener and on the desired properties of the curable composition and of the cured product. The maximum amount can easily be determined. If the hardener is an amine, 0.75 to 1.25 equivalents of amine hydrogen are usually used per 1 epoxy equivalent. If polycarboxylic acids or the anhydrides thereof are used, 0.4 to 1.1 equivalents of a carboxyl group or of an anhydride group are usually used per 1 epoxy equivalent. If polyphenols are used as hardener, 0.75 to 1.25 phenolic hydroxyl groups are used per 1 epoxy equivalent.

If desired, the additives customary in epoxy resin technology may also be added to the novel epoxy resin mixture. Such customary additives are typically fillers, e.g. glass powder or metal powder, mineral fillers, such as $Al_2O_3 \cdot nH_2O$, or silicates, dyes, pigments, e.g. titanium dioxide or carbon black, processing agents such as lubricants, flow control agents, thixotropic agents, stabilisers, adhesion promoters between fillers and resin, hardening catalysts or mould release agents.

If further customary additives are added to the novel mixtures, the amount of the additives is determined by the specific utility of the novel mixtures.

The novel mixtures are prepared by methods known per se, for example by means of known mixing units such as stirrers, kneaders, rollers or, in the case of solid substances, dry mixers.

The cure of the novel mixtures to give mouldings, coatings or the like is carried out in the customary manner employed in epoxy resin technology by heating, as described, inter alia, in "Handbook of Epoxy Resins", 1967, by H. Lee and K. Neville. The curing temperature is in usually in the range from 50° to 200° C.

The novel mixtures of this invention may suitably be used as casting resins, laminating resins, adhesives, moulding materials, coating compositions and coating systems for electrical and electronic components, preferably for the production of mouldings or coatings.

Accordingly, the present invention also relates to the use of the novel mixtures for the preparation of mouldings or coatings.

Preparation of the metal salt complexes

Example A

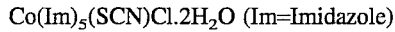
$Co(Im)_5(SCN)Cl \cdot 2H_2O$ (Im=Imidazole)

0.01 mol of cobalt(II) chloride and 0.011 mol of KSCN are dissolved together in 20 ml of water and the resulting claret-coloured solution is slightly cooled. The cobalt solution so obtained is then added, with stirring, to a solution of 0.0625 mol of imidazole in water. After few seconds, a pink precipitate forms. The batch is cooled to c. 10° C. and the resulting precipitate is isolated by filtration and washed with a minor amount of a 2% aqueous solution of imidazole. The product is then dried at 40° C. under a slight vacuum (0.13 bar).

Elemental analysis for $Co(Im)_5(SCN)Cl \cdot 2 H_2O$ in %: calculated: C 36.34 H 4.57 N 29.13 Co 11.14 S 6.06 Cl 16.70 $H_2O$ 6.81 found: C 36.42 H 4.66 N 28.97 Co 10.9 S 5.98 Cl 6.62 $H_2O$ 6.71 C 36.55 H 4.58 N 29.26 S 6.21 Cl 16.67 $H_2O$ 6.81

Example B $Co(Etlm)_4(SCN)_2$ (Etml=2-Ethylimidazole)

0.01 mol of cobalt nitrate is dissolved in 20 ml of methanol and added, with stirring, to a solution of 0.02 mol of KSCN in 20 ml of methanol. The white precipitate which forms is isolated by filtration and washed twice with 10 ml of methanol. The combined filtrates are added to a solution of 0.045 mol of 2-ethylimidazole in 30 ml of methanol and the resulting dark blue solution is concentrated to c. 20 ml and cooled to −20° C. Purple crystals precipicate after 12 hours and are then washed with water and dried at 40° C. under a slight vacuum (0.13 bar).

Elemental analysis for $Co(Etlm)_4(SCN)_2$ in %: calcd.: C 47.22 H 5.76 N 25.05 Co 10.35 S 11.46 found: C 46.82 H 5.77 N 25.01 Co 10.3 S 11.21 $H_2O$<0.3 C 47.10 H 5.66 N 25.05

Example C

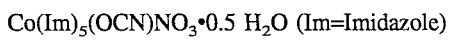
$Co(Im)_5(OCN)NO_3 \cdot 0.5 H_2O$ (Im=Imidazole)

0.01 mol of cobalt nitrate and 0.2 mol of KOCN are dissolved together in 20 ml of $H_2O$. The resulting blue solution is added, with stirring, to a solution of 0.065 mol of imidazole in 20 ml of $H_2O$. After few seconds, the product begins to precipitate. After about 30 minutes, the precipitate is isolated by filtration and washed with a minor amount of a 2% aqueous solution of imidazole. The product is then dried at 40° C. under a slight vacuum (0.13 bar).

Elemental analysis for $Co(Im)_5(OCN)NO_3 \cdot 0.5 H_2O$ in %: calcd.: C 37.51 H 4.13 N 32.81 Co 11.50 OCN 8.20 $H_2O$ 1.76 found: C 37.41 H 4.03 N 32.81 Co 11.1 OCN 7.31 $H_2O$ 1.63 C 37.71 H 4.11 N 32.65

Example D

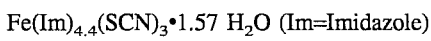
$Fe(Im)_{4.4}(SCN)_3 \cdot 1.57 H_2O$ (Im=Imidazole)

0.01 mol of iron(III) nitrate nonahydrate is dissolved in 20 ml of ethanol (96%). To this solution is added, with vigorous stirring, a solution of 0.03 mol of KSCN in 20 ml of ethanol, whereupon a white precipitate immediately forms. The whole batch is filtered and the precipitate is washed with small amounts of ethanol until the filtrate runs almost colourless. To the reddish-brown liquid is then added a solution of 0.04 mol of imidazole in 20 ml of ethanol and the resulting solution is concentrated on a rotary evaporator until a reddish-brown oil free of ethanol remains.

Elemental analysis for $Fe(Im)_{4.4}(SCN)_3 \cdot 1.57 H_2O$ in %: calcd.: C 34.88 H 3.75 N 29.63 Fe 10.01 S 17.23 $H_2O$ 5.07 found: C 34.7 H 3.8 N 28.8 Fe 9.61 S 17.7 $H_2O$ 5.07 found: $NO_3$ 0.59

Example E

$Fe(Etlm)_{4.4}(SCN)_3 \cdot 3.65 H_2O$
(Etlm=2-Ethylimidazole)

0.01 mol of iron(III) nitrate nonahydrate is dissolved in 0.03 mol of KSCN in 20 ml of ethanol, whereupon a white precipitate immediately forms. The whole batch is filtered and the precipitate is washed with small amounts of ethanol until the filtrate runs almost colourless. To the reddish-brown liquid is then added a solution of 0.04 mol of 2-ethylimidazole in 20 ml ethanol and the resulting solution is concentrated on a rotary evaporator until a reddish-brown oil free of ethanol remains.

Elemental analysis for $Fe(Etlm)_{4.4}(SCN)_3 \cdot 3.65 H_2O$ in %: calcd.: C 41.52 H 6.53 N 22.86 Fe 7.57 S 13.30 $H_2O$ 9.08 found: C 41.2 H 6.3 N 21.1 Fe 7.57 S 13.3 $H_2O$ 9.08 found: $NO_3$ 0.34

EXAMPLES 1–8

5 g of each of the metal complexes listed in the following Table 1 are stirred into 100 g of a liquid mixture of diglycidyl ether of bisphenol A and bisphenol F, having an epoxy value of 5.5 to 5.8 equivalents/kg and a viscosity of 6500 to 8000 mPa.s. The solubility of the metal complex in the epoxy resin is determined by visually assessing a sample of the epoxy resin in a transmitted light microscope at 60-fold magnification.

Similarly, 20 g of each of the metal complexes listed in the following Table 1 are stirred into 100 g of propylene carbonate. The propylene carbonate solutions are then filtered through a suction filter (P 16 for analytic microfiltration, pore width 10–16 μm) and the filter cake is then weighed.

The results are shown in Table 1.

TABLE 1

Solubilities of the metal complexes

| Metal complex salt | Solubilities | |
|---|---|---|
| | 5% in epoxy-resin | 20% in propylene carbonate |
| $Co(Im)_6(OCN)Cl \cdot 3 H_2O$ | + | + |
| $Co(Im)_5(SCN)Cl \cdot 2 H_2O$ | * | – |
| $Co(EtIm)_4(SCN)_2$ | * | + |
| $Co(EtIm)_4(SCN)(acetate)$ | + | + |
| $Co(Im)_5(OCN)_{0.6}(ClO_4)_{1.4} \cdot 0.6 H_2O$ | * | – |
| $Fe(Im)_{4.4}(SCN)_3 \cdot 1.57 H_2O$ | + | + |
| $Fe(EMI)_4(SCN)_3 \cdot nH_2O$ | + | + |

Im = Imidazole
EtIm = 2-Ethylimidazole
EMI = 2-Ethyl-4-methylimidazole
Assessment:
+ desired solubility easily attained
* desired solubility just attained
– desired solubility not quite attained

EXAMPLE 9

7.5 g of the liquid complex $Fe(EtIm)_{4.4}(SCN)_3 \cdot 3.65 H_2O$ according to Example E are added to 150 g of liquid diglycidyl ether of bisphenol A, having an epoxy value of 5.1 to 5.4 equivalents/kg and a viscosity at 25° C. of 12000 to 16000 mPa.s, and mixed at room temperature to give a homogeneous clear solution. To this mixture are added 150 g of quartz powder (Novacite®1250, supplied by Chemag) as filler. With stirring, the mixture so obtained is cautiously alegassed under vacuum, to give a homogeneous void-free and readily pourable mixture. This mixture is then poured into a mould preheated to 90° C. to give sheets of 4 mm thickness. Curing is carried out for 45 minutes at 90° C. and for 60 minutes at 150° C.

The samples obtained from the sheets have the following mechanical properties:

Tensile strength according to ISO 527/93:
 modulus of elasticity=5828 N/mm$^2$
 $\sigma_{max}$=55.7 N/mm$^2$
 ε at $\sigma_{max}$=1.32%
Flexural strength according to ISO 178/75:
 modulus of elasticity=6001 N/mm$^2$
 $\sigma_{max}$=86.5 N/mm$^2$
 ε at $\epsilon_{max}$=1.72%.

EXAMPLE 10

7.5 g of the finely ground complex $Co(Im)_5(SCN)NO_3 \cdot 0.12 H_2O$ are added to 150 g of liquid diglycidyl ether of bisphenol A. having an epoxy value of 5.1 to –5.4 equivalents/kg and a viscosity at 25° C. of 12000 to 16000 mPa.s and mixed at 60° C. for 10 minutes to give a homogeneous bluish violet solution. To this solution are then added 150 g of quartz powder (Novacite®1250, supplied by Chemag) as filler. With stirring, the mixture so obtained is cautiously degassed at room temperature under vacuum, to give a homogeneous void-free and readily pourable mixture. This mixture is then poured into a preheated mould to give sheets of 4 mm thickness. Curing is carried out for 45 minutes at 100° C. and for 60 minutes at 150° C.

The samples obtained from the sheets have the following mechanical properties:

Tensile strength (according to ISO 527/93):
modulus of elasticity=6210 N/mm$^2$
 $\sigma_{max}$=35.8 N/mm$^2$
 ε at $\sigma_{max}$=0.64%
Flexural strength according to ISO 178/75:
 modulus of elasticity=6450 N/mm$^2$
 $\sigma_{max}$=61.8 N/mm$^2$
 ε at $\sigma_{max}$=1.0%.

EXAMPLE 11

15 g of the liquid complex $Fe(EtIm)_{4.4}(SCN)_3 \cdot 3.65 H_2O$ according to Example E are added to 300 g of liquid diglycidyl ether of bisphenol A, having an epoxy value of 5.1 to 5.4 equivalents/kg and a viscosity at 25° C. of 12000 to 16000 mPa.s, and mixed at room temperature to give a homogeneous clear solution. With stirring, the mixture so obtained is cautiously degassed at room temperature under vacuum, to give a homogeneous void-free and readily pourable mixture. This mixture is then poured into a mould preheated to 80° C. to give sheets of 4 mm thickness. Curing is carried out for 60 minutes at 80° C., for 30 minutes at 90° C., and for 90 minutes at 150° C. The samples obtained from the sheets have the following mechanical properties:

Tensile strength according to ISO 527/93:
 modulus of elasticity=2520 N/mm$^2$
 $\sigma_{max}$=38.7 N/mm$^2$
 ε at $\sigma_{max}$=1.96%
Flexural strength according to ISO 178/75:
 modulus of elasticity=2431.8 N/mm$^2$
 $\sigma_{max}$=97.9 N/mm$^2$
 ε at $\sigma_{max}$=5.17%.

What is claimed is:

1. A curable mixture comprising
 (a) an epoxy compound having on average more than one epoxy group per molecule,
 (b) a metal complex salt of formula I

$$M(L)_a X'_b X''_c \cdot dY \qquad (I),$$

wherein
 M is a cation of a transition metal,
 L is a heterocyclic Lewis base,
 a is a number from 2 to 6,
 X' is an anion of an acid radical,
 X" is SCN$^-$ or OCN$^-$,
 b and c are numbers greater than 0, and the sum of b and c corresponds to the valency of the cation of the transition metal,
 Y is a solvent molecule, and
 d is 0 to 5, and
 as an optional component
 (c) a hardener other than (b) for epoxy resins wherein X' and X" are not the same.

2. A mixture according to claim 1, wherein component (a) is a diglycidyl ether or a polyglycidyl ether, an epoxidised polyolefin, a fatty acid ester, a cycloaliphatic epoxy compound, or a glycidyl compound of an aromatic amine.

3. A mixture according to claim 1, wherein component (a) is a diglycidyl ether of a bisphenol.

4. A mixture according to claim 1, wherein component (b) is a metal complex salt of formula I, wherein M is a cation of a transition metal of the first transition series.

5. A mixture according to claim 1, wherein component (b) is a metal complex salt of formula I, wherein L is an imidazole, a pyrazole or a triazole.

6. A mixture according to claim 1, wherein component (b) is a metal complex salt of formula I, wherein a is 4, 5 or 6.

7. A mixture according to claim 1, wherein component (b) is a metal complex salt of formula I, wherein Y is water.

8. A curable mixture comprising, (a) an epoxy compound having on average more than one epoxy group per molecule, (b) a metal complex salt of formula I $$M(L)_a X'_b X''_c \cdot dY \qquad (I)$$

wherein
M is a cation of a transition metal,
L is a heterocyclic Lewis base,
a is a number from 2 to 6,
X' is an anion of an acid radical,
X'' is an anion of an acid radical differing from X',
b and c are numbers greater than 0, and the sum of b and c corresponds to the valency of the cation of the transition metal,
Y is a solvent molecule, and
d is 0 to 5, and as an optional component (c) a hardener other than (b) for epoxy resins, wherein component (b) is a metal complex salt of formula $Co(Im)_5(SCN)Cl \cdot 2 \, H_2O$ or $Co(Im)_6(OCN)Cl \cdot 3H_2O$, wherein Im is imidazole.

9. A mixture according to claim 1, which contains component (b) in an amount of 0.5 to 20% by weight, based on component (a).

10. A mixture according to claim 1, which contains component (b) in an amount of 1 to 10% by weight, based on component (a).

11. A mixture according to claim 1, comprising a component (c).

12. A mixture according to claim 11, wherein component (c) is dicyanodiamide, a polyamine or a polycarboxylic acid anhydride.

13. A moulding or coating obtained from a mixture as claimed in claim 1 by curing.

* * * * *